United States Patent [19]
Smith et al.

[11] Patent Number: 5,211,750
[45] Date of Patent: May 18, 1993

[54] SYNTHETIC AGGREGATE AND LANDFILL METHOD

[75] Inventors: Charles L. Smith, Conshohocken; John J. Juzwiak, Ivyland, both of Pa.

[73] Assignee: Conversion Systems, Inc., Horsham, Pa.

[21] Appl. No.: 717,528

[22] Filed: Jun. 19, 1991

[51] Int. Cl.⁵ .......................... C04B 2/02; C04B 18/06
[52] U.S. Cl. .............................. 106/710; 106/DIG. 1; 264/69; 264/118; 264/120; 264/140
[58] Field of Search ............... 264/69, 118, 120, 140; 106/697, 704, 705, 710, DIG. 1

[56] References Cited

U.S. PATENT DOCUMENTS

| | | |
|---|---|---|
| Re. 30,943 | 5/1982 | Nicholson . |
| 1,942,770 | 1/1934 | Peffer et al. . |
| 2,564,690 | 8/1951 | Havelin et al. . |
| 2,698,252 | 12/1954 | Havelin et al. . |
| 2,815,294 | 12/1957 | Havelin et al. . |
| 2,937,581 | 5/1960 | Havelin et al. . |
| 3,076,717 | 2/1963 | Minnick . |
| 3,230,103 | 1/1966 | Minnick . |
| 3,501,323 | 3/1970 | Moorehead . |
| 3,642,445 | 2/1972 | Muter et al. ........................ 23/25 Q |
| 3,720,609 | 3/1973 | Smith et al. . |
| 3,785,840 | 11/1974 | Minnick et al. . |
| 3,962,080 | 6/1976 | Dulin et al. ........................ 210/59 |
| 4,018,619 | 4/1977 | Webster et al. . |
| 4,038,095 | 7/1977 | Nicholson . |
| 4,049,462 | 9/1977 | Cocozza ........................... 106/85 |
| 4,058,406 | 11/1977 | Raponi ............................. 106/90 |
| 4,101,332 | 7/1978 | Nicholson . |
| 4,171,951 | 10/1979 | Lin . |
| 4,226,630 | 10/1980 | Styron . |
| 4,250,134 | 2/1981 | Minnick . |
| 4,316,813 | 2/1982 | Vass . |
| 4,344,796 | 8/1982 | Minnick . |
| 4,354,876 | 8/1982 | Webster . |
| 4,375,986 | 3/1983 | Pichat ............................. 106/85 |
| 4,377,414 | 3/1983 | Buschmann et al. . |
| 4,387,653 | 6/1983 | Voss . |
| 4,394,176 | 7/1983 | Loggers . |
| 4,397,801 | 8/1993 | Minnick . |
| 4,419,312 | 12/1983 | Loggers et al. . |
| 4,482,096 | 11/1984 | Lin . |
| 4,490,178 | 12/1984 | Loggers et al. . |
| 4,496,267 | 1/1985 | Gnuedinger . |
| 4,514,307 | 4/1985 | Chestnut et al. . |
| 4,613,374 | 9/1986 | Smith . |
| 4,624,711 | 11/1986 | Styron . |
| 4,683,006 | 7/1987 | Walker . |
| 4,741,782 | 5/1988 | Styron . |
| 4,744,829 | 5/1988 | Eirich et al. ..................... 106/704 |
| 4,770,709 | 9/1988 | Loggers . |
| 4,770,831 | 9/1988 | Walker . |
| 4,877,453 | 10/1989 | Loggers . |
| 4,880,582 | 11/1989 | Spanjer et al. ................... 264/82 |
| 4,911,757 | 3/1990 | Lynn et al. ....................... 106/697 |
| 4,917,733 | 4/1990 | Hansen . |
| 4,941,772 | 7/1990 | Roesky et al. . |
| 5,019,360 | 5/1991 | Lehto .............................. 423/132 |

OTHER PUBLICATIONS

Fly Ash Lightweight Aggregate: The Agglite Process-Styron, Proceedings, Eighth Internatioal Ash Utilization Symposium (1987), pp. 58-1 to 58-12.

(List continued on next page.)

*Primary Examiner*—Mary Lynn Theisen
*Attorney, Agent, or Firm*—Ratner & Prestia

[57] ABSTRACT

An abrasion resistant synthetic aggregate made from an intimately intermixed combination of lime, fly ash and sulfate/sulfite sludge (e.g. FGD sludge), mixed to the point where the mixture is nearly optimum density and compressible or non-compressible and plastic. This mixture is placed in a landfill. After a relatively brief cure period, the landfill is ripped and the material is crushed and graded. The aggregate, which in some instances may qualify as a light weight aggregate, has a Los Angeles Abrasion Resistance of less than 60%, and may in some cases be less than 50% (medium particles passing) according to that test.

14 Claims, No Drawings

OTHER PUBLICATIONS

Laboratory Test Results–Manz, Collings, Perri, and Golden, Proceedings: Eighth Int'l Ash Utilization Symposium, vol. 1 (1987) pp. 8-1 to 8-19.

Testing of Manufactured Gravel for Products Specification in Israel–Boas, Ninth Ash Symposium (1991), pp. 24-1 to 24-13.

The Aggregate of the Future vs. here Today–Courts, Proceedings, 9th International Ash Utilization Symposium (1991) pp. 21-1 to 21-10.

The Manuf. and the Use of Art. aggre. from Fly Ash Produced Accord. to Dulch Cold Bended "Aardelite" Process–Boas and Spanger, Proceedings British Ash Symposium (1984).

Lightweight Aggreg. Prod. And Use in Florida–Hay and Dunslan., Proced., 9th International Ash Symposium (1991) pp. 22-1 to 22-10.

Art. Graul as a Graul Subs. in Asphaltic Concrete–Nuclear and Hanlepen Proc., 9th Inter. Ash Util. Sym (1991) pp. 23-1-23-11.

Synthetic Gnaul. from Dry Fly Gas Desulruzation End.–Products–Donnelly, Jens and Webster, Proceedings, The Challenge of Change–6th Inter. Ash Utilization Symposium (1982) pp. 187-207.

Templite Catalyst–A New Construction Material, Temple and Styron (Note: The citation for this reference is not known by inventors).

Fly Ash Lightweight Aggregate: A New Process–Styron, Proceedings of the Seventh International Ash Utilization Symposium & Exposition, vol. II (May 1985) pp. 834 to 844.

Utilization of Advances SO2 Control-by-Products:

SYNTHETIC AGGREGATE AND LANDFILL METHOD

BACKGROUND OF THE INVENTION

This invention pertains to a landfill method particularly useful for making synthetic aggregate and to the aggregate made thereby.

The manufacture of synthetic aggregate from hardened lime fly ash compositions, including in some cases flue gas desulfurization sludge solids, has previously been proposed. See, for example, U.S. Pat. No. 3,785,840 (of common assignment and partial common inventorship herewith). Generally, the methods proposed have involved forming aggregate shaped particles and curing them. These products have generally been unsatisfactory as synthetic aggregates for various reasons; most notably, usually poor abrasion resistance. Many efforts have also been made to improve the reactivity of lime-fly ash or lime-fly ash-sludge compositions. See, for example, U.S. Pat. No. 4,613,374, a sole invention of one of the co-inventors herein (and of common assignment herewith). The possible criticality of compression or pressure in the forming of such mixes to make the products has been noted in other contexts. See, for example, U.S. Pat. No. 4,377,414—Buschmann et al. More specific efforts to produce a synthetic aggregate from lime and fly ash, together in some cases with other waste materials, are reflected in the commercial products known as Agglite (a combination of Portland cement and fly ash) and Aardelite (lime and fly ash). References specifically describing these products include:

Agglite:
U.S. Pat. No. 4,624,711
U.S. Pat. No. 4,741,782

Fly Ash Lightweight Aggregate: The Agglite Process—Styron, Proceedings, Eighth International Ash Utilization Symposium (1987) pp. 58-1 to 58-12.

The Aggregate of the Future is Here Today—Courts, Proceedings, Ninth International Ash Utilization Symposium (1991) pp. 21-1 to 21-10.

Aardelite:
U.S. Pat. No. 4,394,176
U.S. Pat. No. 4,419,312
U.S. Pat. No. 4,490,178

Manufacturing Use of Artificial Aggregates from Fly Ash Produced According to the Dutch Cold Bond "Aardelite" Process—Boas and Spanjer, Proceedings British Ash Symposium (1984)

Lightweight Aggregate Production and Use in Florida—Hay and Dunstan, Proceedings, Ninth International Ash Utilization Symposium (1991) pp. 22-1 to 22-10.

Artificial Gravel as a Gravel Substitute in Asphaltic Concrete—Mulder and Houtepen, Proceedings, Ninth International Ash Utilization Symposium (1991) pp 23-1 to 23-11

Testing of Manufactured Gravel for Products Specification in Israel (1988—1989)—Boas, Proceedings, Ninth International Ash Utilization Symposium (1991) pp. 24-1 to 24-13.

Additional references reflecting other recent attempts to make synthetic aggregate also include:

Templite Catalyst—A New Construction Material—Temple and Styron, from (Source unknown), pp 232 to 239

Fly Ash Lightweight Aggregate: A New Process—Styron, Proceedings, Seventh International Ash Utilization Symposium and Exposition, Volume II, (1985) pp 835 to 844.

Synthetic Gravel from Dry Fly Gas Desulfurization End-Products—Donnelly, Jons and Webster, Proceedings, The Challenge of Change—Sixth International Ash Utilization Symposium (1982) pp. 187 to 207.

Utilization of Advanced $SO_2$ Control By-Products: Laboratory Test Results—Manz, Collings, Perri and Golden, Proceedings, Eighth International Ash Utilization Symposium, Volume 1 (1987) pp. 8-1 to 8-19.

Notwithstanding these prior efforts, there remains a need for a synthetic aggregate product, preferably a light-weight product, suitable for use in ordinary construction and economically producible from waste materials such as fly ash, and most particularly also including flue gas desulfurization sludge.

BRIEF DESCRIPTION OF INVENTION

This invention comprises a particulate water-insoluble abrasion-resistant solid material, preferably crushed and graded for use as a synthetic aggregate, and most importantly having an abrasion resistance, as tested by the Los Angeles Abrasion Resistance Test, of less than 60%. The invention also includes the method of making this material by placing an intimate mixture of fly ash, lime, flue gas desulfurization (FGD) sludge, and water, in proper proportions, in a landfill and repeatedly applying compactive effort through two stages, a first stage in which the material is made significantly more dense in repeated applications of compactive effort, and a second stage, following the first stage, wherein through repeated compaction efforts, no further significant increase in density is obtained.

Thereafter the densified material is permitted to react over a period of time, at least equivalent to 28 days at 73° F., and then torn up or "ripped". The ripped material is crushed and graded into typical aggregate particle gradation.

As indicated above, the starting material for this process comprises an intimate mixture of fly ash, lime, FGD sludge and water (with the possible inclusion of substitute pozzolanic materials for fly ash and other waste materials having lime values for lime). This mixture includes 2.5 to 6% lime and a fly ash to sludge solids ratio of 0.5:1 to 4:1 (dry weight basis). This combination of material is sufficiently intermixed (effected by mixer intensity and residence time) to yield a relatively homogeneous mixture having wet sludge solids inclusions ("sludge balls") of generally no more than ⅛ inch in maximum dimension. This is preferably accomplished in accordance with the mixing procedure described in the aforementioned U.S. Pat. No. 4,613,374.

Depending on the water content of the mixture, the intensity of mixing (and the composition of the material generally) it may be at or near an optimum density compressible mix or it may be a non-compressible (but also non-freely flowable) mix. In contrast to conventional processes, the present invention accommodates such non-compressible mixes, which heretofore have been of little or no value for landfill placement. In the present invention, such material may be used, and in some cases may be preferred, because the non-compressibilty of these mixtures (which may be a function of the thixotropic nature of some FGD wastes) is a result of the intimate mixing which is essential for the reaction in the present invention.

However, in accordance with present invention, such non-compressible mixtures, preferably including over 4.5% lime, are repeatedly compacted over a period of days, so that some preliminary reaction occurs consuming water and rendering the material compressible. Thereafter, repeated compression or compaction results in the increase of density in successive stages, as required in the present invention, followed eventually by the stage in which no further densification occurs. The material is then permitted to cure as described above.

An important aspect of the present invention is that it provides a useful (and novel) by-product as an economically attractive adjunct of an environmentally acceptable FGD sludge disposal process. Moreover, the synthetic aggregate product of this invention may qualify as a light weight aggregate.

DETAILED DESCRIPTION OF THE INVENTION

As indicated in the background statement above, the making of synthetic aggregate from waste materials, and particularly cementitiously hardened waste materials, has been an elusive objective, particularly for those trying to do so with lime-fly ash or preferably lime fly ash flue gas desulfurization sludge mixtures. To applicants' knowledge, such aggregate products have generally not been sufficiently abrasion-resistant to be commercially useful.

The term "abrasion-resistant" is a property quantified as the weight percentage lost by an article after undergoing the Los Angeles Abrasion Test as detailed in the test standard of ASTM C 535-89, entitled "RESISTANCE TO DEGRADATION OF LARGE-SIZE COARSE AGGREGATE BY ABRASION AND IMPACT IN THE LOS ANGELES MACHINE". This test involves rotating and grinding mineral aggregates in a steel drum and measuring the percentage of fines produced. This is done by screening to remove "fines". These fines are then weighed, and this measured weight is divided by the original pre-crushed and screened weight of the sample to determine the weight percentage lost from the original crushed material. Whenever a percentage is given to indicate abrasion-resistance, the percentage represents the weight percentage of the original article which is lost after undergoing the Los Angeles Abrasion Test.

The Los Angeles Abrasion-Resistance Test is important in determining what aggregates are permitted for use in construction of road surfaces. For example, the Florida Department of Transportation prohibits the use of an aggregate having an abrasion resistance of over 45%; the Pennsylvania Department of Transportation prohibits the use of an aggregate having an abrasion resistance over 40% as high quality aggregate, and over 55% as low quality aggregate.

The product of the present invention is also said to be "water-insoluble". This means that it does not soften, melt or dissolve in water. These properties, of course, result from the well known cementitious reaction which occurs in wet lime, fly ash, FGD sludge mixtures.

In the preferred use of the landfill method of the present invention, the method provides an environmentally acceptable method for disposal of, and an economically attractive by-product from, a particularly noxious waste material, that is the sludge residue resulting from lime or limestone scrubbing of the stack gases of a pulverized coal combustion unit (flue gas desulfurization or FGD sludge). (Other similar waste sludges, comprised primarily of alkaline earth metal sulfates and/or sulfites may be similarly disposed of and used.) This sludge is made part of a reactive mixture with lime, fly ash and water. The solids in FGD sludge are typically entrapped in difficult-to-separate water, and comprise for the most part alkaline earth metal sulfates and sulfites. The proportion of sulfate to sulfite also is significant. When the proportion of sulfite is high, the sludge waste tends to be thixotropic and to be more difficult to mix. Essentially any ratio of sulfate to sulfite in the FGD sludge may be incorporated in the mixtures of the present invention. Generally, the minimum amount of sludge included is that amount which results in the reactive mixture going into the landfill comprising at least 20% sludge solids.

Two other important reactive materials in the present invention are lime and fly ash. The lime, measured as quicklime (calcium oxide) may be present as quicklime or as hydrated lime. Other materials may be substituted for lime in a proportion determined by the available calcium oxide in these materials, as measured by conventional analysis techniques. Magnesium oxide and hydrated magnesium oxide may also be included as a part of the lime reactant. By-product forms of quicklime or hydrated lime (such as by-products from acetylene, Portland cement, or lime production processes) may also be substituted in whole or in part. Other lime-contributing additives which may be substituted include BOF and blast furnace waste dust, or slag.

In general, the proportion of lime in the reactive mixture of the present invention is from 2.5 to 6% (by dry weight), the requirement for lime tending toward the higher part of this range for thixotropic mixtures, the optimum otherwise being about 4 or 4.5%.

Fly ash is the fine, dry, particulate material solidified and collected from the exhaust gas of a pulverized coal burning combustion unit. It is typically pozzolanic in nature. Because it is pozzolanic, fly ash combines with water and an alkaline earth material, such as lime, to yield a cementitious reaction. Fly ash is generally separated from flue gases by the use of a mechanical collector or an electrostatic precipitator. Fly ash, for purposes of the present invention, may also comprise the fine ash recovered from the stack gases of an oil combustion unit or of trash incinerators. The extent to which these ashes may be substituted for ordinary bituminous fly ash depends on the pozzolanic activity of that material. This is measurable in accordance with the testing method of ASTM C 593. Based on the pozzolanic activity of a typical bituminous pulverized coal combustion ash (collected electrostatically) as the standard, the reaction mixture of the present invention should include at least 33% (dry weight basis) of such typical material.

As indicated above, at least 33% fly ash is required, on a dry weight basis. Since fly ash may comprise substantially the entire mixture, other than lime, its upper limit is only limited to the degree that other materials are present, such as lime and sludge, or inert materials included with other substitutes for lime or fly ash. Because sludge solids ordinarily also make up at least 20% (on a dry weight basis) of the reactive mixture going into the landfill, the maximum amount of fly ash included is about 80%, by weight solids.

Possible substitutes for fly ash include coal mine refuse or tailings, "red mud" resulting from the chemical reduction of bauxite, alum waste, or essentially any highly amorphous siliceous or alumino siliceous incineration residue. These materials may be substituted to the extent they contribute the amount of pozzolanic activity normally contributed by the 33% minimum fly ash required, as determined by the pozzolanic activity test of ASTM C 593.

Water is, of course, also necessary in the reaction of the present invention, and, generally speaking, the minimum amount of water present will be 5% less than that amount necessary to form an optimum density mixture (an optimum density mixture is one that contains hust enough water to fill all the interstices in the particulate solids mixture of fly ash, lime and sludge solids). Water in excess of the amount which produces an optimum density mixture is permissible so long as the mixture is plastic, i.e. non-fluid or not freely flowable. The maximum water content is exceeded when the reactive mixture flows freely, all mixtures with water levels below this amount being referred to as "non-fluid". This maximum varies with the proportion of sulfates and sulfites in the sludge, the proportion of sludge solids in the mixture (mixtures with a higher proportion of sulfates tending away from thixotropy and therefore having a lower maximum water content, and mixtures with a higher portions of sulfites tending toward thixotropy and therefore having a higher maximum water content) and the intensity of mixing imparted to the mixture.

It is important that the reactive mixture in the present invention be intimately mixed or interdispersed, much like that described in the aforementioned '374 patent, which, for purposes of describing the degree of mixture preferred, is incorporated herein by reference. However, such mixing tends to produce non-compressible mixtures, which heretofore have generally not been considered suitable for placement in landfill because of their non-compressible nature. In accordance with the present invention, the range of reactive mixtures which may be utilized include somewhat more water than the upper limits of that comprehended at the time of the '374 patent. Thus such non-compressible mixtures are accommodated in the landfill by permitting them to react over a period of several days with intermittent compression or compaction of the mixture by repeated application of compactive effort over the several day period, until they become compressible. This compactive effort is applied by surface traversing equipment, such as a vibratory roller, a large steel drum roller, or a bulldozer.

A critical factor in the present invention, by which synthetic aggregate is made from a landfill-placed and cured lime-fly ash sludge mixture is the attainment of a high degree of reactivity in a landfill, which in-turn depends upon the composition of the mixture, the water content of the mixture, the intimate mixing, as described above, and perhaps most important, the compression or densification of the mixture.

As in prior landfill methods, the reactive mixture in the present invention, if it is compressible to start with, is densified or compressed by repeatedly applying compactive effort, preferably by a vibratory roller or some other form of applying pressure to the landfill by a surface traversing means. In the case of compressible mixtures, with sufficient water to be near optimum density, a certain amount of densification (i.e. a significant increase in density) is observed with each pass of the compaction device. By significant is meant an overall increase in density on the order of 5 to 15% in the initial pass (with the material starting in an uncompacted state) and successively less densification in each pass until after about 10 to 20 passes very little further densification occurs in several sequential passes of the compaction device. At this point, a compressible mixture will typically have achieved about 95% of optimum density. Also at this point in the process, the mixture is ready for cure and upon curing will be ready for ripping, crushing, and grading, to form the synthetic aggregate of the present invention.

In those cases where the reactant mixture, generally because of the inseparable water present and the intense mixing required, is non-compressible, the repeated application of compressive force in the early stages, may take place over several days so as to allow a preliminary cementitious reaction to proceed, with the consumption of water. In this way, the mixture is rendered compressible, whereupon continued sequential passes with the compaction device, the required significant increase in density (initially on the order of at least 3–5% per pass) is attained through densification of the wet particulate mixture, much as in a conventional lime fly ash sludge landfill. This is followed by a final sequence of passes until little or no increase in density is observed. Thus, even non-compressible mixtures may be convertible, in accordance with the present invention, into a strong, abrasion resistant product, which is useful to produce abrasion resistant synthetic aggregate upon ripping, crushing and grading.

In all cases, the reactive mixture is initially placed in a landfill in layers such that upon the first passage of the compaction equipment, the layer will be from about 8 to about 24 inches thick. After the sequential passes with compaction equipment are completed, the compressed landfill is permitted to react for a period of time, generally a minimum of 28 days at 73° F., or the equivalent of that cure cycle, taking into account both time and the temperature of the mixture during the cure.

After that time, the hardened landfill layer is "ripped" i.e. torn up into subdivisions suitable for crushing and grading. After crushing and grading into particle size distribution typical of the desired aggregate, the product, in accordance with the present invention, is both water-insoluble and abrasion-resistant, and thus is ideally suited for use as an aggregate. Los Angeles Abrasion Resistance Tests have shown that products in accordance with the present invention have been produced with abrasion resistance values of generally less than 60%, and in some cases less than 50%, depending on the proportion of lime (preferably about 4%, or slightly more in the case of thixotropic mixtures), relatively high fly ash to sludge ratios, and effective mixing. Quantities of synthetic aggregate, made in accordance with the present invention have been incorporated in concrete block compositions, in commercial block-making equipment, to produce concrete blocks of generally commercial quality.

In contrast to the synthetic aggregate produced in accordance with the present invention, attempts to produce synthetic landfill by ripping, crushing, and grading conventionally produced lime-fly ash-scrubber sludge landfills, from various commercial operations of applicant's assignee, yielded Los Angeles abrasion values of from 63 to 79% (medium gradation, percent passing). One prior commercial landfill site which had been placed over two years prior to the test did yield a Los Angeles abrasion resistance (medium gradation, percent passing) of 58%, but this was believed to be a coincidental finding, due in part to the fact that the landfill was over two years old at the time of testing. This is in contrast to the present invention, which consistently yields synthetic aggregate with less than 60% medium percent passing in the Los Angeles Abrasion Resistance Test, even for landfill in place for as little as 30 days. It should be noted that in one of the pre-invention (or conventional) landfill sites tested for this purpose, the mixture was, in fact a mixture produced in accordance with the aforementioned '374 patent. This landfill had been in place also for over a year at the time of testing. However, it is believed that the material had not been sufficiently compressed, as required in the present invention, to produce the abrasion resistant product which is the object of this invention.

In summary, the present invention yields an abrasion-resistant (and in some cases "light weight") aggregate by producing a hardened landfill material, in a relatively short time, which is suitable upon harvesting as an aggregate-sized particulate material.

By way of further example, described below are two tests in which lime-fly ash-FGD sludge mixtures have been made, placed, cured and converted into synthetic aggregate, all in accordance with the present invention; this aggregate was then used as an replacement for conventional aggregate in making concrete block with results as described below.

In the first experiment, electrostatically collected bituminous coal fly ash from the Palatka, Fla., generating station of the Seminole Electric Cooperative, Inc., was combined with dewatered (52% solids) sludge, resulting from the wet scrubbing of stack gases at the same facility, in a weight proportion of fly ash to sludge solids of 0.8:1. Quicklime was added to yield a dry weight basis quicklime content of 5%. No additional water was added. One hundred tons of this mixture was intimately combined in a pugmill mixer normally used to mix sludge, fly ash and lime in a conventional landfill fixation process. In this experiment, the pugmill was modified to make a more homogeneous mixture (⅔ of the blades were reversed, thus doubling the normal 30 second retention time in the mixer). In this intimate and relatively homogeneous mixture, the inclusions of wet sludge solids (sometimes referred to as "sludge balls") generally ranged in diameter up to about ⅛ inch, as compared to normal mixes in which such sludge balls would range up to about 1¼ inch in size.

A highly reactive, though non-compressible, combination resulted. The water content of this intimate mixture was slightly in excess of the amount of water required for optimum density of the mixture and the physical state of the mixture was such that, because of its plasticity or non-compressibility, it would not ordinarily have been placed in a conventional landfill, in which materials of this type are ordinarily placed.

In this case, however, 100 tons of this material was placed in a landfill in a layer about 18 inches in depth and this layer was compacted by repeated passes with a steel drum roller having a vibratory attachment. Because the mixture was non-compressible, very little compression or compaction occurred in the first few passes. However, this procedure was repeated each day for about eight (8) days, after which significant densification was achieved in sequential passes of the vibratory roller. This compression was observed on days 9, 10, 11, 12, and 13, with an overall density increase of about 12% in that time period.

Thereafter, repeated passes with a vibratory roller achieved very little effective further densification, and when the compression upon repeated passes with the vibratory roller was observed to effect compression of less than about 0.5% per pass, the procedure was discontinued.

This compacted mixture was then permitted to cure for about two and one half months at ambient conditions (in a landfill near Palatka, Fla. during the time period of March to June). The pad was then ripped up by a bulldozer, shredded and screened in order to produce typical aggregate size gradation. This gradation is set forth in Table 1 below.

TABLE I

| DATA ON SIZED AGGREGATE | |
|---|---|
| Bulk Density (Dry, Rodded) | 56.4 lbs. ft.$^3$ |
| Moisture (WWB) | 18.6% |
| Passing | |
| 1" | 100.0% |
| ½" | 95.4% |
| #4 | 2.5% |
| #8 | 0.4% |

The aggregate made as described above was then incorporated in several batches of otherwise conventional block compositions in a commercial concrete block-making plant. The proportions used, including in some cases other conventional aggregates, are set forth for four of these batches in Table II below, along with the average gross compressive strength of the resulting blocks. In Table II, the term "CSI Agg" refers to the synthetic aggregate of this invention, as described above.

TABLE II

| | BLOCK COMPOSITIONS | | | |
|---|---|---|---|---|
| | 1 | 2 | 3 | 4 |
| Type I | | | | |
| Cement | 500 lbs. | 420 lbs. | 550 lbs. | 470 lbs. |
| CSI Agg. | 775 | 1700 | 775 | 1700 |
| Screenings | 1400 | 2100 | 1400 | 1800 |
| Sand | 1800 | 0 | 1800 | 2100 |
| Total Weight | 4475 lbs. | 4220 lbs. | 4525 lbs. | 6070 lbs. |
| Compressive Strength (PSI) (28 Day Cure) | 1210 | 1040 | 1130 | 1030 |

These blocks were generally of good appearance. When tested by an independent testing laboratory, using the test procedure of ASTM C-90, all blocks met the strength requirements of this test procedure for concrete block.

In the foregoing example of the present invention, the synthetic aggregate had a bulk density of about 56 pounds per cubic foot; considering its particle size gradation, this material was slightly high in density, but otherwise qualified as a light weight aggregate under ASTM C-331. In a second test, aggregate was produced in a procedure similar to that described in the foregoing example, except that the lime content in the second test was 40% and the cure time was slightly in excess of six months. Upon crushing and grading, two different gradations were produced, as shown in Table II below. These aggregate gradations had a bulk density of 60–62 pounds per cubic foot and thus qualified as light weight aggregates under ASTM C-331.

This aggregate was also tested for Los Angeles abrasion resistance and was found to have an abrasion resistance value of 48.7%.

Using the aggregate gradations shown in Table III, Concrete blocks were made in these tests in accordance with commercial procedures using commercial block production equipment. The block units formed were cured under ambient conditions and then tested as required by ASTM C-90. The resultant blocks, utilizing the synthetic aggregate of the present invention, met the requirements of that specification. Table IV includes additional data resulting from this test.

In Table IV, these sample aggregates are identified as "CSI". Comparative data is also included for four different test sets based on commercial formulations and convention aggregate (namely pea rock screening and sand from two commercial producers identified as "T" and "R"). Computer designed optimized formulations of these commercial materials were used as "control" batches.

TABLE III

| | LANDFILL AGGREGATE | |
|---|---|---|
| | CSI ⅜" × 0 | CSI ⅜" × #14 |
| ⅜" | 100.0 | 100.0 |
| ¼" | 100.0 | 100.0 |
| ⅛" | 100.0 | 100.0 |
| #4 | 98.4 | 69.9 |
| #8 | 87.8 | 17.3 |
| #16 | 65.6 | 3.0 |
| #50 | 19.5 | 1.7 |
| #100 | 4.9 | 0.7 |

TABLE IV

| | #1 CONTROL (WT) | #2 CSI (WT) | #2A CSI (WT) | #3 CONTROL (WT) | #3A 20% CSI (WT) | #3B 44% CSI (WT) | #4 60% CSI (WT) |
|---|---|---|---|---|---|---|---|
| T PEA ROCK (%) | 44.7 | | | | | | |
| T SCREENING (%) | 30.1 | | | | | | |
| T SAND (%) | 25.2 | 44.4 | 44.4 | | | | |
| CSI 3.8" × #14 | | 55.6 | 55.6 | | 6.9 | 23.2 | 59.7 |
| R PEA ROCK (%) | | | | 50.5 | 34.4 | 27.1 | |
| R SAND (%) | | | | 49.5 | 45.2 | 29.4 | 40.3 |
| CSI ⅜" × 0(%) | | | | | 13.4 | 20.3 | |
| PORT CEM (LB/BLOCK) | 2.9 | 3.1 | 3.1 | 2.9 | 3.1 | 3.1 | 3.1 |
| WATER (GAL) | 3.5 | 1 | 0 | 3 | 2.5 | 1.5 | 2.75 |
| STRENGTH (psi) | | | | | | | |
| 1 DAY | 257 | 193 | 314 | 551 | 792 | 492 | 366 |
| 7 DAYS | 919 | 935 | 716 | 1882 | 1949 | 983 | 1062 |
| 14 DAYS | 809 | 1006 | 775 | 1933 | 1661 | 1133 | 1089 |
| 28 DAYS | 1888 | 1140 | 910 | 1992 | 1466 | 1155 | 1233 |
| BLOCK WEIGHT (lbs) (AV OF 3) | | | | | | | |
| 1 DAY | 36.5 | 36.9 | 33.8 | 37.9 | 35.4 | 34.2 | 33 |
| 7 DAYS | 34.7 | 34.1 | 32.4 | 37.4 | 34.3 | 33 | 32.9 |
| 14 DAYS | 35.2 | 33.6 | 31.7 | 37 | 34.2 | 32.5 | 32.2 |
| DENSITY (LB/FT3) | 122.1 | 11.9 | 104.3 | 124.9 | 118.5 | 114.8 | 108 |
| ABSORPTION (LB/FT3) | 10.47 | 12.47 | 18.92 | 9.61 | 12.65 | 12.77 | 15.93 |

From the data in Table IV, it is apparent that the synthetic aggregate produced in accordance with the present invention, (which as demonstrated in the date of Table III qualifies as "light weight aggregate) can be used in making commercially acceptable concrete blocks.

While this invention has been described with reference to specific embodiments thereof, the appendant claims should not be construed as limited thereto. Instead, these claims are to cover such other embodiments and forms of the invention as may be devised by those skilled in the art without departing from the true spirit and scope thereof.

We claim:

1. A method of making an abrasion-resistant cementitiously hardened synthetic aggregate by
   a) forming an intimate, initially non-compressible reactant mixture by intense mixing of a material combination comprised of 2.5–6% lime, at least 33% fly ash and at least 20% alkaline earth metal sulfate/sulfite sludge solids (all on a dry weight basis), with water in an amount no less than 5% below that necessary to form an optimum density mixture with the solids in the mixture,
   b) placing said intimate, initially non-compressible reactant mixture in a landfill in a layer of sufficient thickness to be 8 to 24 inches thick after the first compression pass of step d), below,
   c) waiting a sufficient time to permit a water-consuming reaction to occur in said mixture and to render said intimate, initially non-compressible reactant mixture compressible,
   d) applying pressure to said mixture rendered compressible by step c) by traversing the surface thereof with a means for applying compactive pressure thereto, in a sequence of passes to cause a significant increase in density from pass to pass to form a densified mixture,
   e) permitting said densified mixture to harden as a monolithic mass over a cure period at least equivalent to 28 days at 73° F.,
   f) ripping said cured monolithic material into subdivisions thereof, and
   g) collecting, crushing and screening said subdivisions into gradations suitable for use as aggregate.

2. A method as recited in claim 1 further comprising the step of successively repeating steps c) and d) to the point where said densified mixture has substantially achieved maximum densification.

3. An aggregate, produced in accordance with the method of claim 1, and meeting the ASTM specification for light weight aggregate.

4. A method of making an abrasion-resistant cementitiously hardened synthetic aggregate by a) forming a reactant mixture by intense mixing of a material combination comprised of 2.5–6% lime, at least 33% fly ash and at least 20% alkaline earth metal sulfate/sulfite sludge solids (all on a dry weight basis), with water in an amount no less than 5% below that necessary to form an optimum density mixture with the solids in the mixture, b) placing said reactant mixture in a landfill in a layer of sufficient thickness to be 8 to 24 inches thick after application of pressure according to step c), below, c) applying compactive pressure to said mixture by traversing the surface thereof with a means for applying compactive pressure thereto, d) waiting a sufficient time to permit a water-consuming reaction to occur, e) and then applying further compactive pressure to said mixture by traversing the surface thereof with a means for applying compactive pressure thereto, in a sequence of passes to cause an increase in density from pass to pass to form a densified mixture, f) permitting said densified mixture to harden as a monolithic mass over a cure period at least equivalent to 28 days at 73° F., g) ripping said cured monolithic material into subdivisions thereof, and h) collecting, crushing and screening said subdivisions into gradations suitable for use as aggregate.

5. A method as recited in claim 4 wherein said combination of material is intimately mixed prior to placement with a degree of mixing at least equivalent to about 30 seconds in a Hobart planetary mixture at first speed and whereby the composition is mixed to a degree at least approaching the thixotropic state.

6. A method as recited in claim 5, wherein the mixture is thixotropic and step e) occurs over a period of at least several days.

7. A method as recited in claim 6, wherein flue gas desulfurization sludge is included in said mixture, and the ratio of fly ash to sludge solids on a dry weight basis, from 0.5:1 to 4:1.

8. A method as recited in claim 6, wherein said lime is present in a proportion of from 4 to 6%.

9. A method as recited in claim 5 wherein lime is present in a proportion of 3.5 to 4.5%.

10. A method as recited in claim 4 wherein the compaction means is a vibratory roller.

11. A method as recited in claim 4 wherein said reactant mixture is initially non-compressible after step a).

12. A method as recited in claim 4 wherein said reactant mixture is initially compressible after step a).

13. A method as recited in claim 4 further comprising the step of successively repeating steps d) and e) to the point where said densified mixture has substantially achieved maximum densification.

14. An aggregate, produced in accordance with the method of claim 4, and meeting the ASTM specification for light weight aggregate.

* * * * *